United States Patent [19]

Arndt et al.

[11] Patent Number: 4,522,642
[45] Date of Patent: Jun. 11, 1985

[54] SOIL TREATING METHOD AND COMPOSITION FOR CONSERVING NITROGEN IN SOIL

[75] Inventors: Kim E. Arndt, Pittsburg; Richard B. Rogers; Ronald W. McCormick, both of Concord, all of Calif.

[73] Assignee: The Dow Chemical Company, Midland, Mich.

[21] Appl. No.: 624,428

[22] Filed: Jun. 25, 1984

[51] Int. Cl.$^3$ .............................................. C05C 13/00
[52] U.S. Cl. ............................................ 71/11; 71/902
[58] Field of Search ........................ 71/1, 11, 28, 702; 260/429 R, 429.9

[56] References Cited

U.S. PATENT DOCUMENTS 3,494,757  2/1970  Osborne ........................ 71/902 X
3,635,690  1/1972  Griffith ......................... 71/902 X Primary Examiner—Ferris H. Lander
Attorney, Agent, or Firm—S. Preston Jones; Ronald G. Brookens

[57] ABSTRACT

Certain metal salts of certain substituted pyrazole compounds are employed as the active nitrification inhibitor in the presence of reduced nitrogen fertilizers. Compositions containing these salts can be applied to the surface of soil and can remain on said soil surface for up to 3 days or more without incorporation into the soil and retain at least about 70 percent of the pyrazole in the salt in the composition.

21 Claims, No Drawings

SOIL TREATING METHOD AND COMPOSITION FOR CONSERVING NITROGEN IN SOIL

BACKGROUND OF THE INVENTION

The majority of plants obtain most or all of their nitrogen requirements from the soil. The adequate provision of nutrient nitrogen in soil for plant growth is one of the foremost agronomic problems. The nitrogen in the soil is found to occur primarily in three forms: organic nitrogen, ammonium nitrogen and nitrate nitrogen, of which ammonium nitrogen and nitrate nitrogen are the primary forms utilized by plants. This nitrogen is absorbed by plants in solution from the soil in the form of ammonium ions and nitrate ions.

The ammonium nitrogen in the soil occurs principally as colloidal-bound nitrogen, only very small quantities of the ammonium form of soil nitrogen are lost from the feeding zone of the plants by leaching.

The nitrate nitrogen in the soil is derived from the oxidation or nitrification of ammonium nitrogen by soil bacteria or by the addition of inorganic nitrate fertilizers such as ammonium nitrate, sodium nitrate, potassium nitrate and calcium nitrate. The inorganic nitrate compounds are readily soluble in water and the aqueous soil medium. When so dissolved, the nitrate nitrogen largely exists as the nitrate ion.

The nitrogen contained in the nitrate, in contrast to ammonium nitrogen, is not adsorbed by the sorption carriers of the soil. A further discussion of the nature of this nitrogen problem in agriculture is set forth in U.S. Pat. No. 3,135,594.

Because of the anionic nature of this nitrate ion, nitrate nitrogen is rapidly leached by rainfall and irrigation and readily lost from the feeding zone of the plants. Further, the nitrate nitrogen is reduced by many soil bacteria to nitrogen gas. The latter process is known as denitrification and accounts for an additional loss of large quantities of nitrate nitrogen from the soil. The yearly loss from leaching and denitrification amounts to from 20 to 80 percent of the nitrate nitrogen found in the soil.

To overcome the loss of ammonium nitrogen in the soil by nitrification, it is the practice to add to the soil a nitrification inhibitor.

Representative nitrification inhibitors and their use can be found in U.S. Pat. Nos. 3,135,594, 3,494,757 and 3,635,690 and British Pat. No. 1,592,516.

While the known inhibitors are effective in reducing nitrification, they, for the most part, have a major drawback in that they must be incorporated into the soil within a very short period of time, i.e., a few minutes to a few hours in order to avoid losses of the inhibitor to the air. This requirement for quick incorporation hinders and/or restricts the use of nitrification inhibitors in agronomic practices where no till or minimum till is employed and in those areas where fertilizers are added and incorporation is delayed.

SUMMARY OF THE INVENTION

The present invention is directed to methods and compositions useful in crop culture, and is particularly concerned with new agronomical practices and compositions for conserving nitrogen in soil by suppressing the nitrification of ammonium nitrogen therein. The active agent of the compositions employed in such methods is a pyrazole compound-metal salt corresponding to the formula

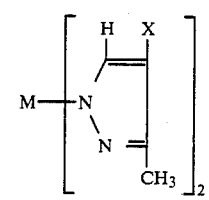

wherein M represents cobalt, copper, manganese, nickel or zinc and X represents hydrogen, bromo, chloro or methyl.

The pyrazole compounds employed in making the salts are 3-methylpyrazole, 4-bromo-3-methylpyrazole, 4-chloro-3-methylpyrazole and 3,4-dimethylpyrazole.

While the active pyrazoles of the present invention are normally depicted as shown in Formula I, it is believed that these compounds also exist in two additional isomeric forms. These isomers can be depicted as follows:

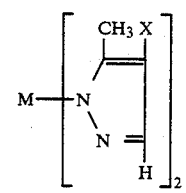

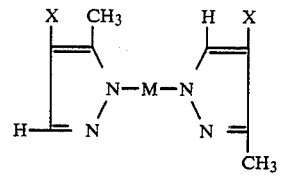

wherein M and X are as above set forth.

It is further believed that the product obtained in the preparation of Formula I is a mixture of the three isomers and the depiction of either one of the isomers should be taken as the inclusion of all three isomers.

The method of the present invention comprises applying to soil a composition which contains, as the active nitrification inhibitor, a pyrazole compound-metal salt as defined above. A further feature of the method of the present invention is that the pyrazole compound-metal salt in admixture with a reduced nitrogen fertilizer can be applied to the surface of soil where it can remain without incorporation into the soil for a period of up to 3 days or more, with at least about 70 percent of the pyrazole compound remaining. After administration subsequent irrigation or rainfall can distribute the pyrazole compound-metal salt throughout the growth medium.

The expression "soil" is employed herein in its broadest sense to be inclusive of all conventional "soils", as defined in Webster's New International Dictionary, Second Edition, unabridged, published in 1937, G. C. Merriam Co., Springfield, Mass. Thus, the term refers to any substance or medium in which plants may take root and grow, and is intended to include not only earth, but also compost, manure, muck, sand, synthetic growth mediums such as vermiculite and pearlite and the like, adapted to support plant growth.

By the practice of this invention, the nitrification of ammonium nitrogen in the soil to nitrate nitrogen is suppressed, thereby preventing the rapid loss of ammonium nitrogen from the soil. Furthermore, by proper distribution of the pyrazole compound this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers.

The expression "reduced nitrogen fertilizers" as employed in the present specification and claims, is understood in the art, as embracing both inorganic and organic nitrogenous materials containing nitrogen in the reduced state. Examples of known reduced nitrogen fertilizers include anhydrous ammonia, aqueous ammonia, inorganic ammonium salts such as ammonium phosphates, ammonium nitrate and ammonium sulfate, ammonium salts or organic acids, urea, cyanamide, guanidine nitrate, dicyandiamide, thiourea, urea-form and other nitrogen-containing organic chemical fertilizers as well as protein mixtures, animal tankages, green manure, fish products, crop residues, and other materials known to be sources of ammonium ions in soil.

The application of an effective, nitrification inhibiting, dosage of the pyrazole compound-metal salt to the soil is essential for the practice of the present invention. In general, good results are obtained when the pyrazole compound-metal salt is applied in the amount of from about 0.05 to about 5.0 pounds per acre of soil. The preferred amounts to be employed are dependent upon the particular situation. Thus, in determining the amount to be employed, consideration is necessary as to the soil pH, soil organic matter, temperature, soil type and time of application. By dispersing very large dosages to soil, a prolonged inhibition of nitrification can be obtained over a period of many months. The concentration of the active pyrazole compound-metal salt is eventually reduced to a minimum by decomposition in the soil.

In one method for carrying out the present invention, the pyrazole compound is distributed to the soil in a broadcast application such as by spraying, dusting, distributing in irrigation water, etc. In such application, the pyrazole compound-metal salt is supplied in amounts of from about 0.05 to about 5.0 pounds per acre.

In another method for carrying out the present invention, the pyrazole compound-metal salt is administered to the soil in a band or row application. In such application, administration is made with or without carrier in amounts sufficient to supply to the soil a concentration of the pyrazole compound-metal salt which can be as high as 5.0 pounds per acre or more.

In one embodiment of the present invention, the pyrazole compound-metal salt is distributed throughout the soil prior to seeding or transplanting the desired crop plant.

In another embodiment, the soil in the root zone of growing plants is treated with the pyrazole compound-metal salt in an amount effective to inhibit nitrification but sublethal to plant growth.

In a further embodiment, the pyrazole compound-metal salt can be applied following harvest or after fallowing to prevent rapid loss of ammonium nitrogen and to build up the ammonium nitrogen formed by conversion of organic nitrogen compounds. Such practice conserves the soil nitrogen for the following growing season. In such application the upper limit is primarily an economic consideration.

Additionally, the pyrazole compound-metal salt can be applied prior to, subsequent to or simultaneous with the application of a reduced nitrogen fertilizer. Such practice prevents the rapid loss of the ammonium nitrogen added as fertilizer and the ammonium nitrogen formed from the organic reduced nitrogen in fertilizers by the action of soil bacteria. In a preferred procedure, the pyrazole compound-metal salt is employed as a solid or liquid composition comprising a reduced nitrogen fertilizer in intimate admixture with the pyrazole compound-metal salt.

As indicated above, the present method embraces distributing the pyrazole-compound-metal salt as a constituent in liquid or solid fertilizer compositions. In such practice, the pyrazole compound-metal salt is admixed with the fertilizer and such mixture can be modified with one or more additaments or soil treating adjuvants to formulate the mixtures employing conventional procedures as wettable powders, emulsifiable concentrates, dust, granular formulations or oil or water flowable emulsion concentrates. In preparing such formulations, the pyrazole compound-metal salt/fertilizer mixture is extended with adjuvants including water, petroleum distillates or other liquid carriers, surface-active dispersing agents and inert finely-divided solids. Preferred adjuvants are surface-active dispersing agents and inert finely-divided solids; these adjuvants cooperate with the pyrazole compound-metal salt so as to facilitate the practice of the present invention and to obtain an improved result. These compositions may also contain as additional adjuvants one or more other biologically active materials such as herbicides, insecticides, fungicides, miticides, bactericides, nematocides, and the like. The only requirement for these added materials is that they be both chemically and biologically compatible with the pyrazole-compound-metal salt.

The concentration of the pyrazole compound-metal salt in the compositions can vary considerably provided the required nitrification inhibition dosage of the effective agent is supplied to the soil. In general, good results are obtained when employing liquid compositions containing from about 0.05 to about 5.0 percent by weight of the pyrazole compound-metal salt; in some operations, however, compositions containing amounts of pyrazole compound-metal salt in excess of 5.0 percent, such as from 5 to 98 percent of the active pyrazole compound-metal salt by weight of composition are conveniently employed, as for example, in row or band application. With solids, good results are usually obtained with compositions containing from 0.05 to 5.0 percent or more by weight of pyrazole compound-metal salt. In some circumstances, such as in high-intensity application, however, it is preferred to employ solid compositions containing as much as from 5 to 98 percent or more by weight of the pyrazole compound-metal salt. Liquid or solid compositions in which the pyrazole compound-metal salt is present in higher concentration can be utilized as such or can be employed as concentrate compositions to be diluted to prepare actual treating compositions.

The liquid compositions containing active agent, i.e., the pyrazole compound-metal salt, can be prepared by admixing one or more of the active agents with water or an organic solvent, with or without the aid of a suitable surface-active dispersing agent or emulsifying agent, and admixing this mixture in an aqueous solution of the desired fertilizer.

Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the growth media.

Dispersing and emulsifying agents which can be employed in liquid compositions include condensation products of alkylene oxides with phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent by weight of the pyrazole compound-metal salt.

Solid compositions containing the active agent can be prepared by admixing the pyrazole compound-metal salt, dispersed in a volatile organic solvent, with the solid fertilizer. In another procedure, the solid fertilizer can be mechanically ground with a dispersion of the pyrazole compound-metal salt in a solvent and the resulting mixture prilled, granulated or otherwise formed into the desired form. After coating, the solvent is vaporized off. In an additional procedure, solid granules of the fertilizer are coated with a sticking agent such as mineral oil and then coated with a mixture of the pyrazole compound-metal salt and a solid carrier.

These solid compositions may, if desired also contain an alkyl aryl sulfonate or other surface-active dispersing agent. Depending upon the proportions of ingredients, these compositions can be employed without further modification or be considered as concentrates and subsequently further diluted with conventional solid carriers such as, talc, chalk, gypsum, clays, or the like to obtain the desired treating composition. Furthermore, such concentrate compositions can be dispersed in water with or without added dispersing agent or agents to prepare aqueous soil treating compositions.

In these fertilizer compositions, it is desirable that the pyrazole compound-metal salt be present in an amount of at least about 0.05 percent by weight based on the weight of the nitrogen present in the fertilizer as reduced nitrogen and can be present in amounts as high as 95 percent by weight of the reduced nitrogen in the fertilizer. Generally, though, amounts of pyrazole compound-metal salt in excess of about 5.0 percent yield no greater advantage and are therefore seldom used. Thus, when a fertilizer composition contains both reduced nitrogen and other forms of nitrogen, such as in the case of ammonium nitrate fertilizer compositions, the amount of pyrazole compound-metal salt is based on the weight of nitrogen present in the ammonium component.

The pyrazole compound-cobalt, copper, manganese, nickel and zinc salts employed in the practice of the present invention are for the most part all known compounds. The few salts which may not be specifically known can be prepared by the same procedures taught for the remaining salts.

The metal salts can be prepared by the procedure taught in TRANS MET CHEM, Volume 4, pages 137–141 (1979) wherein an appropriate pyrazole and the appropriate metal in the form of an aqueous halide salt are reacted in the presence of a base such as a metal hydroxide. The reaction can also be carried out by first admixing the two reactants separately with aqueous ammonium hydroxide (such as 28% NH$_4$OH or its equivalent) and then mixing the two solutions. The metal salt precipitates readily and is recovered by conventional separatory procedures including filtration. The salt can be purified, if desired, by water washing and/or washing with alcohol and/or ether. The product can then be dried, if desired.

In an additional preparative procedure, the metal salts can be prepared by the treatment at room temperature of an appropriate metal complex corresponding to the formula

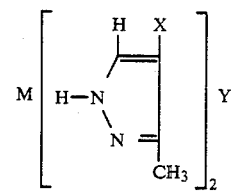

wherein M is as hereinabove defined; Y represents Cl$_2$, Br$_2$, (NO$_3$)$_2$ or SO$_4$ and X represents hydrogen, bromo, chloro or methyl with concentrated ammonium hydroxide. In this process, the complex is added to the concentrated ammonium hydroxide and the mixture is stirred for about 24 hours. The product is recovered by filtration and is washed with water and dried.

The pyrazole compound-metal complexes employed above as a starting material are for the most part all known compounds. The few complexes which may not be known can be prepared by the same procedures taught for the remaining complexes. The complexes can easily be prepared by adding, at room temperature (although higher temperatures can be employed) the appropriate pyrazole in a solvent such as water, an alcohol or a mixture thereof to a stirring solution of the appropriate metal salt in a solvent such as water, an alcohol or a mixture thereof. The reactants are present in the ratio of 2 moles of the pyrazole per mole of the metal salt. The desired complex forms as a solid precipitate which may occur immediately or upon removal of some or all of the solvent. The complex is usually recovered by filtration and dried.

The zinc salts can also be prepared by heating the corresponding zinc bis(substituted pyrazole-1-carbodithioate) of the formula

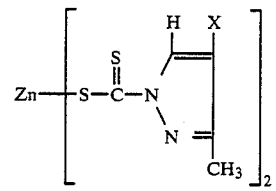

at a temperature of from about 100° C. to about 250° C. The reaction is complete when carbon disulfide evolution ceases.

The zinc bis(substituted pyrazole-1-carbodithioate) employed above as starting materials can be prepared employing the same procedures similar to those taught in Trofimenko, The Journal of Organic Chemistry, Volume 33, No. 2, February 1968, pages 890–892 wherein an aqueous solution of an appropriate alkali metal pyrazole-1-carbodithioate is mixed with the zinc metal ion.

The following examples illustrate the invention but should not be construed as limiting the scope of the invention.

EXAMPLE I

Preparation of copper salt of 3-methylpyrazole

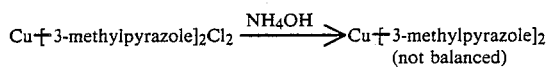
(not balanced)

A mixture was prepared by adding 2 grams (g) of bis 3-methylpyrazole:copper complex to 25 milliliters (mls) of concentrated ammonium hydroxide. The mixture turned a deep blue color. The mixture was stirred at room temperature for 24 hours. A green solid had formed and was recovered by filtration using a fine sintered glass funnel. The recovered solids were washed twice with 100 milliliter portions of water and refiltered. The product was dried and recovered in a yield of 1.2 grams (80 percent of theory) and melted above 350° C. Upon analysis, the product was found to have carbon, hydrogen and nitrogen contents of 41.70, 4.29 and 24.64 percent, respectively, as compared with the theoretical contents of 42.56, 4.47 and 24.82 percent, respectively, as calculated for the above-named compound.

EXAMPLE II

Preparation of cobalt salt of 3-methylpyrazole

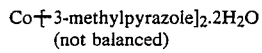
(not balanced)

A mixture was prepared by adding 7.25 g of CoCl$_2$.6H$_2$O to 150 ml of water and stirring. A maroon solution formed. To this mixture was added 5 g of 3-methylpyrazole in 250 ml of water. No color change was seen. Upon the addition of 5 g of 50 percent sodium hydroxide in 50 ml of water, a blue-purple solid precipitated. The resulting slurry was filtered and the recovered solids reslurried in ethanol and then filtered again. The recovered solids were slurried in ether, filtered and then dried. Upon analysis, the product was found to have carbon, hydrogen and nitrogen contents of 37.53, 4.08 and 21.43 percent, respectively, as compared with the theoretical contents of 37.36, 4.71 and 21.78 percent, respectively, as calculated for the above-named compound. The product decomposed above 350° C.

EXAMPLE III

Preparation of zinc salt of 3-methylpyrazole (Method A)

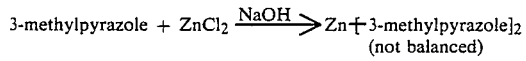
(not balanced)

A mixture was prepared by adding 0.9 g of zinc chloride to 10 mls of water. The mixture was then filtered. To the mixture was added, with stirring, 1.0 g of 3-methylpyrazole. A white precipitate formed which dissolved upon methanol addition. To this mixture was added 2–3 mls of 50 percent sodium hydroxide. The salt precipitated immediately. The product was recovered by filtration, washed twice with 50 mls of water, then twice with 50 mls of ethanol, then twice with 50 mls of ether. The product was then dried leaving a fine white powder which melted above 350° C. Upon analysis, the product was found to have carbon, hydrogen and nitrogen contents of 41.93, 4.31 and 24.58 percent, respectively, as compared with the theoretical contents of 42.22, 4.43 and 24.62 percent, respectively, as calculated for the above-named compounds.

EXAMPLE IV

Preparation of zinc salt of 3,4-dimethylpyrazole (Method B)

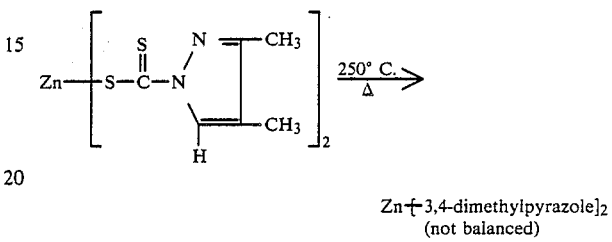

Zn[3,4-dimethylpyrazole]$_2$
(not balanced)

To a round bottom flask was added 4.1 g of zinc bis(3,4-dimethylpyrazole-1-carbodithioate). The compound was heated to 250° C., with stirring, on an oil bath and under an argon atmosphere for about 30 to 40 minutes until the yellow material turned white and fluffy. The product was recovered after cooling in a yield of 2.4 g (94 percent of theoretical). The product melted at above 350° C. Upon analysis, the product was found to have carbon, hydrogen and nitrogen contents of 46.42, 5.35 and 21.75 percent, respectively, as compared with the theoretical contents of 46.99, 5.52 and 21.92 percent, respectively, as calculated for the above-named compound.

EXAMPLE V

A. Preparation of zinc bis(3,4-dimethylpyrazole-1-carbodithioate)

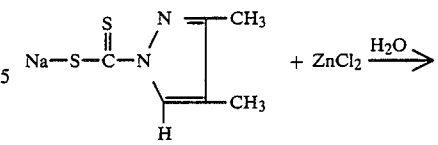

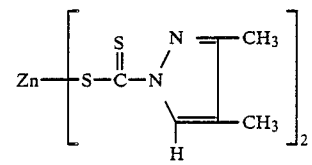

(not balanced)

A mixture is prepared by admixing 7.9 g of the sodium salt of 3,4-dimethylpyrazole-1-carbodithioate in 50 ml of deionized water. This mixture is added to a mixture of 2.6 g of zinc chloride in 250 ml of deionized water. A precipitate formed immediately and the product was recovered by filtration and dried. The product was recovered in a yield of 6.2 g (75 percent of theoretical). The product decomposed above 210° C. Upon analysis, the product was found to have carbon, hydrogen and nitrogen contents of 36.88, 3.54 and 14.31 percent, respectively, as compared with the theoretical contents of 37.10, 3.63 and 14.42 percent, respectively, as calculated for the above-named compound.

B. Preparation of sodium salt of 3,4-dimethylpyrazole-1-carbodithioate

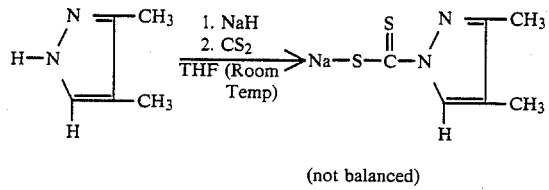

(not balanced)

A slurry was prepared by admixing 2.2 g of 60 percent sodium hydride (after washing this amounts to 1.32 g) with 75 ml of dry tetrahydrofuran. To this slurry was slowly added, with stirring, 5 g of 3,4-dimethylpyrazole. The solution thus formed was filtered and then an excess of carbon disulfide (7 g) was added, with stirring. After 10 minutes, a yellow precipitate formed. The product was removed by filtration and washed with dry ether and dried. The desired product was recovered in a yield of 7.9 g (78 percent of theoretical). The product decomposed at 275°–278° C. Upon analysis, the product was found to have carbon, hydrogen and nitrogen contents of 36.88, 3.54 and 14.31 percent, respectively, as compared with the theoretical contents of 37.10, 3.63 and 14.43 percent, respectively, as calculated for the above-named compound.

The reactions in the above Examples were carried out employing room temperatures and atmospheric pressures.

EXAMPLE VI

Aqueous ammonium fertilizer compositions containing a predetermined amount of nitrogen, by weight, and a sufficient amount of one of the hereinafter set forth pyrazole compound-zinc salts, dispersed in a predetermined amount of water, to give compositions containing 0.063, 0.125, 0.25, 0.5 and 1.0 parts by weight of the salt per million parts of soil were prepared by dispersing the pyrazole compound-zinc salt in a predetermined amount of an aqueous ammonium sulfate solution.

The compositions so prepared were employed to treat a sandy loam soil having a pH of 7.2 and containing 1.2 percent organic matter. The soil was in containers which were sealed to prevent loss of moisture. In the treating operation, the amount of the composition employed was sufficient to bring the soil moisture to ⅓ bar and the soil was thoroughly mixed to insure a substantially uniform distribution of the composition throughout the soil.

In a check operation, other soils similarly prepared were fertilized with a similar aqueous fertilizer composition containing the same amount of acetone but no pyrazole compound-zinc salt. The composition was applied in an amount to supply the same concentration of nitrogen to the soil as the treating composition containing the salt. All of the containers were then sealed and maintained at about 80° F. for a period of 14 days.

At the end of the 14 day period, the extent of nitrification of the added ammonium sulfate fertilizer was determined by analysis for nitrate nitrogen. The analysis was carried out using a nitrate specific electrode similar to that described by Keeney and Nelson on page 633 of Methods of Soil Analysis, part 2 (Second Edition), ASA, Inc., Madison, Wis., 1982. The results of this analysis and the salts tested are set forth below in Table I.

TABLE I

| Salt employed | Percent ammonium nitrogen remaining after 14 days at indicated treating concentrations | | | | |
|---|---|---|---|---|---|
| | 0.063 | 0.125 | 0.25 | 0.5 | 1.0 |
| Zn—(4-chloro-3-methylpyrazole)$_2$ | 45 | 65 | 68 | 79 | 80 |
| Zn—(3-methylpyrazole)$_2$ | 71 | 90 | 94 | 96 | 96 |
| Zn—(3,4-dimethylpyrazole)$_2$ | 58 | 75 | 88 | 92 | 99 |
| Control | | | 0 | | |

EXAMPLE VIII

Aqueous ammonium fertilizer compositions containing a predetermined amount of nitrogen, by weight, and a sufficient amount of one of the hereinafter set forth pyrazole compound-zinc salts, dispersed in a predetermined amount of water, to give compositions containing 0.063, 0.125, 0.25, 0.5 and 1.0 parts by weight of the salt per million parts of soil were prepared by dispersing the pyrazole compound-zinc salt in a predetermined amount of an aqueous ammonium sulfate solution.

The compositions so prepared were employed to treat a sandy loam soil having a pH of 7.2 and containing 1.2 percent organic matter. The soil was in containers which were sealed to prevent loss of moisture. In the treating operation, the amount of the composition employed was sufficient to bring the soil moisture to ⅓ bar and the soil was thoroughly mixed to insure a substantially uniform distribution of the composition throughout the soil.

In a check operation, other soils similarly prepared were fertilized with a similar aqueous fertilizer composition containing the same amount of acetone but no pyrazole compound-zinc salt. The composition was applied in an amount to supply the same concentration of nitrogen to the soil as the treating composition containing the salt. All of the containers were then sealed and maintained at about 80° F. for a period of 28 days.

At the end of the 28 day period, the extent of nitrification of the added ammonium sulfate fertilizer determined by analysis for nitrate nitrogen. The analysis was carried out in accordance with the same procedure as described in Example I. The results of this analysis and the salts tested are set forth below in Table II.

TABLE II

| Salt Tested | Percent ammonium nitrogen remaining after 28 days at indicated treating concentrations | | | | |
|---|---|---|---|---|---|
| | 0.063 | 0.125 | 0.25 | 0.5 | 1.0 |
| Zn—(3,4-dimethylpyrazole)$_2$ | 30 | 38 | 51 | 47 | 51 |
| Zn—(3-methylpyrazole)$_2$ | 22 | 49 | 48 | 56 | 48 |
| Zn—(4-chloro-3-methylpyrazole)$_2$ | 45 | 65 | 68 | 79 | 80 |
| Control | | | 0 | | |

EXAMPLE VIII

Aqueous ammonium fertilizer compositions containing a predetermined amount of nitrogen, by weight, and a sufficient amount of one of the hereinafter set forth pyrazole compound-metal salts, dispersed in a predetermined amount of water, to give compositions containing 10 or 20 parts by weight of the salt per million parts of soil were prepared by dispersing the salt in a predetermined amount of an aqueous ammonium sulfate solution.

niques. The results of this analysis are set forth below in Table IV.

TABLE IV

| Type of Formulation Tested | % Pyrazole Per Gram of Urea | % Clay Per Gram of Urea | % Pyrazole per Gram of Ammonium Nitrogen | Stability at 35° C. % Pyrazole remaining per gram of ammonium nitrogen at following time in weeks[a] | | | | |
|---|---|---|---|---|---|---|---|---|
| | | | | 0 | 1 | 2 | 3 | 6 |
| Granule | 0.125 | 0.066 | 0.25 | 0.271 (100) | 0.280[b] (103) | 0.228 (84) | 0.239 (88) | 0.217 (80) |
| Granule | 0.127 | 0.813 | 0.25 | 0.250 (100) | 0.217 (87) | — | — | 0.175 (70) |

[a] Figure in ( ) is percent (%) of pyrazole remaining based on 0 day amount.
[b] Cannot be more than 100%, error caused by unknown anomaly.

The compositions so prepared were employed to treat a sandy loam soil having a pH of 7.2 and containing 1.2 percent organic matter. The soil was in containers which were sealed to prevent loss of moisture. In the treating operation, the amount of the composition employed was sufficient to bring the soil moisture to ⅓ bar and the soil thoroughly mixed to insure a substantially uniform distribution of the composition throughout the soil.

In a check operation, other soils similarly prepared were fertilized with a similar aqueous fertilizer composition containing the same amount of acetone but no pyrazole compound-metal salt. The composition was applied in an amount to supply the same concentration of nitrogen to the soil as the treating composition containing the salt. All of the containers were then sealed and maintained at about 80° F. for a period of 14 days.

At the end of the 14 day period, the extent of nitrification of the added ammonium sulfate fertilizer determined by analysis for nitrate nitrogen. The analysis was carried out in accordance with the same procedure as described in Example I. The results of this analysis and the salts tested are set forth below in Table III.

TABLE III

| Salt Tested | Percent ammonium nitrogen remaining after 14 days at indicated treating concentrations | |
|---|---|---|
| | 10.0 | 20.0 |
| Cu—(3-methylpyrazole)$_2$ | 100 | 100 |
| Co—(3-methylpyrazole)$_2$.2H$_2$O | 91 | 100 |
| Control | | 0 |

EXAMPLE IX

A study was conducted to determine the stability of bis-3-methylpyrazole:zinc salt when coated onto urea granules.

One hundred gram portions of urea granules were placed into 600 ml beakers and rotated at a 45° angle. To the urea was added as a sticking agent 0.5% neat mineral oil. Bis-3-methylpyrazole:zinc salt in a mixture with a diatomaceous earth clay carrier was slowly added to the rotating mixture as a dust.

Two gram samples of the formulations were weighted into 1 inch diameter × ¼ inch deep round steel planchetts and placed into a 35° C.±1° C. circulating oven. Samples of each formulation were removed from the oven for assay each week for sixteen weeks to determine the amount of pyrazole loss from the surface of the urea. This loss was determined employing standard high pressure liquid chromatograph analysis techniques.

What is claimed is:

1. A composition which comprises a reduced nitrogen fertilizer in admixture with from about 0.05 to about 98 percent by weight of a pyrazole compound-metal salt which corresponds to the formula

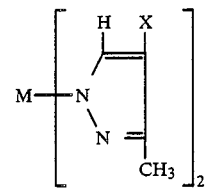

wherein M represents cobalt, copper, or zinc and X represents hydrogen, bromo, chloro or methyl.

2. The composition as defined in claim 1 wherein M represents copper.

3. The composition as defined in claim 1 wherein M represents cobalt.

4. The composition as defined in claim 1 wherein M represents zinc.

5. The composition as defined in claim 1 wherein X is bromo.

6. The composition as defined in claim 1 wherein X is chloro.

7. The composition as defined in claim 1 wherein X is hydrogen.

8. The composition as defined in claim 1 wherein X is methyl.

9. A method for treating soil to inhibit the conversion therein of ammonium nitrogen to nitrate and nitrite nitrogen and to prevent rapid loss of ammonium nitrogen therefrom which comprises applying to soil a nitrification suppressing amount of a composition comprising a reduced nitrogen fertilizer in admixture with from about 0.05 to about 98 percent by weight of a pyrazole compound-metal salt which corresponds to the formula

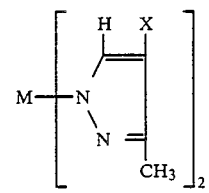

wherein M represents cobalt, copper or zinc and X represents hydrogen, bromo, chloro or methyl.

10. The method as defined in claim 9 wherein M represents copper.

11. The method as defined in claim 9 wherein M represents cobalt.

12. The method as defined in claim 9 wherein M represents zinc.

13. The method as defined in claim 9 wherein X is bromo.

14. The method as defined in claim 9 wherein X is chloro.

15. The method as defined in claim 9 wherein X is hydrogen.

16. The method as defined in claim 9 wherein X is methyl.

17. A nitrification inhibition-fertilizer composition useful for delayed incorporation into soil which comprises a reduced nitrogen fertilizer in admixture with from about 0.05 to about 98 percent by weight of a pyrazole compound-zinc salt which corresponds to the formula

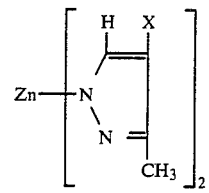

wherein X represents hydrogen, bromo, chloro or methyl.

18. The composition as defined in claim 14 wherein X is bromo.

19. The composition as defined in claim 14 wherein X is chloro.

20. The composition as defined in claim 14 wherein X is hydrogen.

21. The composition as defined in claim 14 wherein X is methyl.

* * * * *